Sept. 22, 1970     J. F. O. EVANS ET AL     3,530,307
A.C. ENERGIZED REMOTE SIGNALLING SYSTEM
Filed Oct. 10, 1967     2 Sheets-Sheet 1
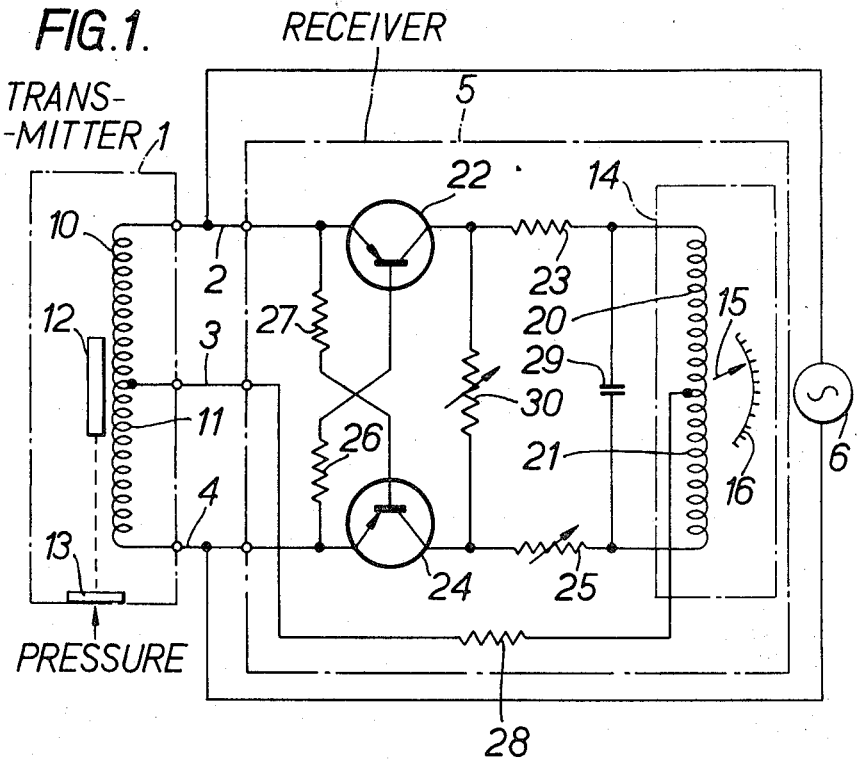
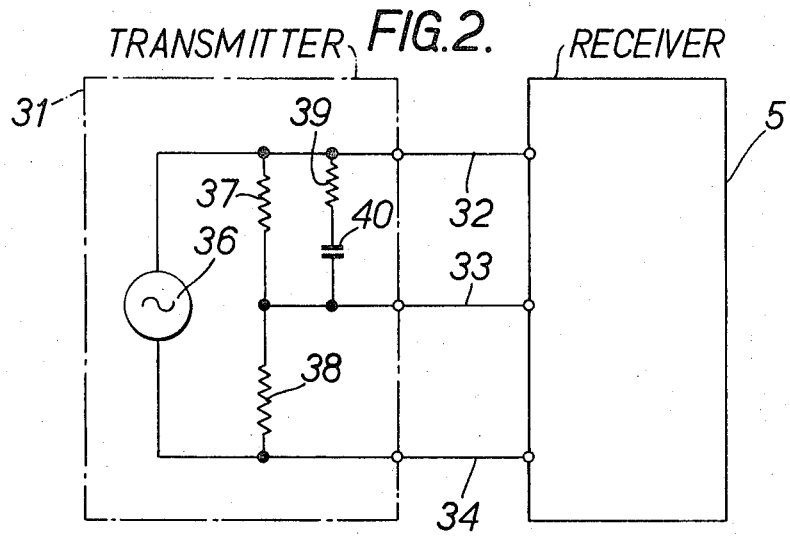
J. F. O. Evans
R. H. Sandford
Inventors
Hall, Pollock & Vande Sande
Attorneys Sept. 22, 1970   J. F. O. EVANS ET AL   3,530,307
A.C. ENERGIZED REMOTE SIGNALLING SYSTEM
Filed Oct. 10, 1967   2 Sheets-Sheet 2
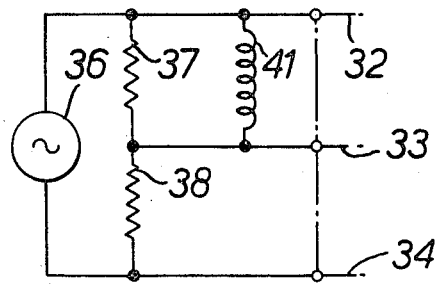
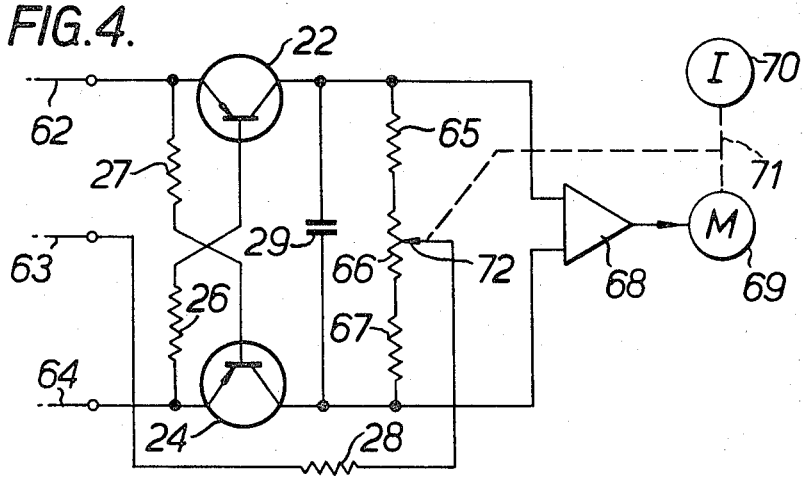
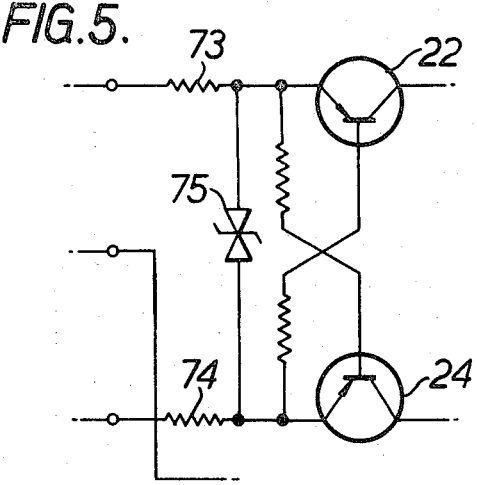
J. F. O. Evans
R. H. Sandford
Inventors
Hall, Pollock & Vande Sande
Attorneys United States Patent Office 3,530,307
Patented Sept. 22, 1970

3,530,307
A.C. ENERGIZED REMOTE SIGNALLING SYSTEM
John F. O. Evans, Micheldever, near Winchester, and Roger H. Sandford, Oakley, near Basingstoke, England, assignors to Smiths Industries Limited, London, England, a British company
Filed Oct. 10, 1967, Ser. No. 674,143
Claims priority, application Great Britain, Oct. 13, 1966, 45,897/66
Int. Cl. H03k *5/20;* G01n *27/00*
U.S. Cl. 307—232
14 Claims

ABSTRACT OF THE DISCLOSURE

A variable-reluctance pressure-sensing transducer has serially-connected windings energized with alternating current, and sensed pressure is indicated by the ratio of the collector-currents of two transistors. The transistors, which conduct alternately with one another are oppositely-connected across the serial-winding combination, each having its emitter and base electrodes connected to opposite ends of the combination. As an alternative, a frequency-sensitive network that replaces the serial-winding combination, is energized by a variable-frequency source such as to apply to the transistors signals having relative amplitudes dependent upon the applied frequency.

This invention relates to electrical signalling systems.

The invention is particularly concerned with electrical signalling systems of the kind in which transmitter means is arranged to derive two cyclically-varying signals having amplitudes that relative to one another are dependent upon the value of a predetermined input variable, the two signals being derived from a common cyclically-varying energizing signal, and means for providing an output representation dependent upon the value of the input variable is arranged to provide said representation in accordance with two direct-current signals that are derived in accordance respectively with the amplitudes of the said two cyclically-varying signals.

An electrical signalling system of the kind specified above is described in Mass et al. U.S. Pat No. 2,614,244 the electrical circuit of the system being shown in FIG. 5 of that patent. This known form of signalling system is generally satisfactory in operation, but nonetheless has several disadvantages where accurate operation is required. In particular it has been found that the electrical balancing of the system, as required for accurate operation, tends to be difficult, such balancing being critically dependent upon the forward-resistances exhibited by diodes used in that system for rectification of the two cyclically-varying signals. Additionally, the system tends to exaggerate in the output indication, errors that arise in the operation of the transmitter means with variation in temperature. This latter disadvantage has been found to be of particular importance where the system is required to monitor, for example, oil-pressure of an engine.

It is one object of the present invention to provide a form of electrical signalling system of the kind specified that may be used to overcome these disadvantages in a simple manner.

According to the present invention, an electrical signalling system of the kind specified includes transistor devices which are for deriving the direct-current signals from said two cyclically-varying signals respectively, and which in this respect are arranged to be responsive to said energizing signal such that they conduct alternately with one another throughout each cycle of said energizing signal.

The energizing signal may be applied across a first and second of three electrical connection-points in the transmitter means, the arrangement being such that one of the two signals derived from the energizing signal appears between the first and third connection-points and the other appears between the second and third points. In these circumstances the two transistor devices may be connected in the system such that emitter and base electrodes of a first of the two transistor devices are coupled respectively to the first and second points, base and emitter electrodes of the second transistor device are coupled to the first and second points respectively, and collector electrodes of both are coupled to said third point, the output representation being in these circumstances provided in accordance with the relative magnitudes of collector-current flow from the two transistor devices.

The transmitter means, as with the transmitter means described in the above-mentioned U.S. Pat. No. 2,614,244, may include two electrical windings and means for varying the reactance of the two windings differentially in accordance with the value of the input variable. The present invention is not, however, limited to systems using this specific form of transmitter means.

The system may include a variable-frequency signal-source for supplying the energiing signal, and in these circumstances it may be arranged that the amplitudes of the two cyclically-varying signals derived by the transmitter means are dependent upon the frequency of the energiing signal. The signal source may be a tachometer, the system in this case providing an output representation dependent upon the speed sensed by the tachometer.

The output representation, which may be a visual representation, may be provided, for example, by a ratiometer device or by a servo arrangement.

Electrical signalling systems in accordance with the present invention will now be described, by way of example, with reference to the accompanying drawings, in which:

FIG. 1 is a circuit diagram of a first of the electrical signalling systems, using a pressure-sensitive transmitter device;

FIG. 2 is a circuit diagram of a second of the electrical signalling systems, using an alternative form of transmitter device;

FIG. 3 illustrates a modification of the transmitter device of FIG. 2;

FIG. 4 is a circuit diagram of an alternative form of receiver device for use with either of the systems of FIGS. 1 and 2; and FIG. 5 illustrates a modification applicable to the receiver device of either of the systems of FIGS. 1 and 2.

Referring to FIG. 1, a transmitter is connected by three leads 2, 3 and 4 to a receiver 5, alternating current to energize the system being supplied from a mains supply source 6 connected to leads 2 and 4. The transmitter 1 of the system is substantially the same as the transmitter described with reference to FIGS. 1 to 4 of the above-mentioned U.S. Pat. No. 2,614,244, and includes two spaced electrical windings 10 and 11 and a ferromagnetic element 12 that is movable with respect to the two windings 10 and 11 to vary their inductive reactances differentially. The ferromagnetic element 12 is coupled in the transmitter 1 to a flexible diaphragm or bellows device 13 so that its position with respect to the two windings 10 and 11 is dependent upon the pressure of fluid (for example, oil) applied in the transmitter 1 to the diaphragm or bellows device 13. (In FIG. 1, the element 12 is shown as a single ferromagnetic part, but it may alternatively comprise two spaced ferromagnetic parts as in the case of the particular transmitter described in U.S. Pat. No. 2,614,244.) The ratio of the inductive reactances of the two windings 10 and 11 accordingly provides a measure of the applied fluid-pressure.

The two windings 10 and 11 are connected in series with one another across the supply source 6, the two ends of the winding 10 being connected respectively to the leads 2 and 3, and the two ends of the winding 11 being connected respectively to the leads 3 and 4. Thus alternating-current signals in accordance with the inductive reactances of the windings 10 and 11 appear respectively between the leads 2 and 3 and between the leads 4 and 3, the relative amplitudes of these two signals providing a measure of the fluid pressure. The receiver 5 is responsive to these two signals to provide an indication of this pressure, and in this respect the receiver 5 includes a ratiometer indicating device 14. The device 14 corresponds to the ratiometer of the system described in U.S. Pat No. 2,614,244, and as represented schematically, has an index 15 and scale 16 for providing the output indication of pressure. The two ratio-windings of the ratiometer device 14 are shown in the drawing as windings 20 and 21, and these are supplied with direct currents derived within the receiver 5 in accordance respectively with the two alternating-current signals supplied by the transmitter 1.

Within the receiver 5, direct current is supplied to the winding 20 via the emitter-collector path of a P-N-P junction transistor 22 and a resistor 23, and to the winding 21 via the emitter-collector current path of a P-N-P junction transistor 24 and a resistor 25. The emitter electrode of the transistor 22 is connected directly to the lead 2, and its base electrode is connected via a resistor 26 to the lead 4. The emitter electrode of the transistor 24, on the other hand, is connected directly to the lead 4, and its base electrode is connected via a resistor 27 to the lead 2. Thus the transistors 22 and 24 are rendered conductive alternately with one another throughout each cycle of the energizing current supplied from the source 6; the transistor 22 conducts to pass current to the winding 20 only during one of the two half-cycles of the energizing current, and the transistor 24 conducts to pass current to the winding 21 only during the other half-cycle.

A common return path for the currents supplied to the windings 20 and 21 is provided to the lead 3 via a resistor 28 connected in the device 14 to the junction of the two windings 20 and 21, the resistor 28 serving to limit the magnitude of current flowing. A capacitor 29 is connected across the two windings 20 and 21 for smoothing purposes, and a variable resistor 30 is connected between the collector electrodes of the transistors 22 and 24 so as to allow for adjustment of the range of ratios to be indicated. The value of the resistor 25 is also variable so as to allow for adjustment during balancing of the system.

The circuit of the receiver 5, using the two transistors 22 and 24 connected in effect directly across the supply source 6, combines with simplicity the advantage that the periods of conduction of these two transistor devices are synchronized positively to the supply current. This latter advantage is of particular importance where the transmitter 1 is subject to variation in temperature. Variation in temperature brings with it variation in the direct-current resistances of the windings 10 and 11, together with variation in their inductive reactances, and so results in variation in the phasings of the two alternating-current signals derived by the transmitter 1. The transistors 22 and 24 are operated in a phase-conscious manner to select for application to the windings 20 and 21 effectively only those components of the two signals that are of a particular phasing; any component of quadrature phase is of zero mean-value throughout the half-cycle of conduction of the relevant transistor, and therefore does not have any effect in the indication provided by the ratiometer device 14. In this manner the indication provided by the device 14 is substantially independent of temperature effects, and this thereby overcomes practical difficulties experienced with the system, using diode-rectification, described in U.S. Pat. No. 2,614,244.

The two alternating-current signals applied to the receiver 5 via the leads 2, 3 and 4 may be derived by means other than the pressure-sensitive transmitter 1 described above. According to a feature of the present invention, these two cyclically-varying signals are derived by a frequency-sensitive network from a cyclically-varying signal having a frequency dependent upon the sensed variable. The system shown in FIG. 2 is an example of the manner in which the receiver 5 of FIG. 1 may be used in accordance with this feature of the present invention.

Referring to FIG. 2, a transmitter 31, which in the present case is connected to the receiver 5 via leads 32, 33 and 34 (corresponding to the leads 2, 3 and 4 of FIG. 1) includes a variable-frequency signal generator 36. The generator 36 generates an alternating-current signal having a frequency dependent upon the value of the variable being sensed; where, for example, the variable is rotational speed, then the generator 36 may be a tachometer generator. The generated signal is applied across a frequency-sensitive network that includes in addition to two serially-connected resistors 37 and 38, a resistor 39 and a capacitor 40 connected in series with one another across the resistor 37. The amplitudes of the two alternating-current signals appearing respectively across the resistor 37 and across the resistor 38 are dependent upon the frequency of the generated signal, and accordingly provide a measure of the value of the sensed variable. The receiver 5 provides an indication of this value in dependence upon these two signals as conveyed thereto via the leads 32, 33 and 34.

FIG. 3 illustrates an alternative form of the transmitter 31, in which an inductor 41 is used in place of the resistor 39 and capacitor 40.

The receiver 5, rather than including the ratiometer indicating device 14 of FIG. 1 for providing the output indication, may be modified as shown in FIG. 4 to provide a servo-controlled output.

Referring to FIG. 4, the modified receiver 5 receives the two alternating-current signals via leads 62, 63 and 64 (corresponding to the leads 2, 3 and 4 of FIG. 1, or to the leads 32, 33 and 34 of FIGS. 2 and 3), the transistors 22 and 24 conducting, as before, during alternate half-cycles of the energizing current. The resulting direct currents are in this case supplied from the transistors 22 and 24 to opposite ends of a resistance chain that comprises three serially-connected resistors 65, 66 and 67, and also to a direct-current amplifier 68. The amplifier 68 controls the energization of a servo motor 69 in accordance with any difference in magnitude between the two direct currents it receives.

The motor 69 drives an indicator device 70 via a shaft 71, and also via the shaft 71 positions a movable tap 72 on the resistor 66. The tap 72 is connected via the resistor 28 to the lead 63 so as to provide a common return path for the direct currents supplied by the transistors 22 and 24. The motor 69 accordingly drives the tap 72 to a position on the resistor 66 for which there is substantial equality between the direct currents received by the amplifier 68. The rotational position of the shaft 71 in these circumstances provides a measure of the variable represented by the alternating-current signals received from the leads 62, 63 and 64, and the indicator device 70 provides an output indication appropriate to this.

If there is a likelihood of the energizing current (supplied from the source 6 of FIG. 1, or from the source 36 of FIGS. 2 and 3) including transients that may damage the transistors 22 and 24 then the modification illustrated by FIG. 5 may be adopted. Transients of this nature may arise where the source of the energizing current is common to a plurality of different electrical systems, and in particular, where switching operations are carried out.

Referring to FIG. 5, protection against transients is provided simply by including resistors 73 and 74 in the emitter-connections of the transistors 22 and 24 respectively, and by connecting a double-anode Zener device 75 between the emitter electrodes of these two transistors 22 and 24. The operative voltage of the Zener device 75 is chosen to lie above the normal peak-voltage of the energizing signal but below the peak-rating of each transistor 22 and 24.

With the above-described systems the energization current is in each case of sinusoidal waveform. This is not essential, however; cyclically-varying energization signals of other waveform, for example of square waveform, may equally-well be used.

We claim:

1. An electrical signalling system comprising: first, second and third electrical circuit points; means for applying a cyclically-varying energizing signal between said first and second points; signal-deriving means coupled across said first and second points for deriving from said energizing signal two cyclically-varying signals having amplitudes that relative to one another are dependent upon the value of a predetermined variable, said signal-deriving means comprising means to apply said first signal between said first and third points and means to apply said second signal between said second and third points; rectifying means comprising two cross-connected transistor devices for rectifying said first and second signals, a first of the two transistor devices having emitter and base electrodes coupled to said first and second points respectively, and a collector electrode coupled to said third point, and the second transistor device having base and emitter electrodes coupled to said first and second points respectively, and a collector electrode coupled to said third point; and output means for providing an output representation dependent upon the value of said predetermined variable in accordance with the relative magnitudes of collector-current flow from said first and second transistor devices.

2. An electrical signalling system according to claim 1 wherein said signal-deriving means comprises inductance means interconnecting said first and third points, further inductance means interconnecting said second and third points, and means for varying the inductive reactance of the two inductance means differentially in dependence upon variation in value of said variable.

3. An electrical signalling system according to claim 1 wherein said signal-deriving means presents between said first and third points an impedance having a reactive component, and presents between said second and third points an impedance that is substantially solely resistive, and wherein said means for applying the energizing signal between the first and second points is a variable-frequency signal-source.

4. An electrical signalling system according to claim 1 including a double-anode Zener device connected between the emitter electrodes of said first and second transistor devices to provide these two devices with transient-protection.

5. An electrical signalling system according to claim 1 wherein said output means comprises means for providing a visual representation dependent upon the relative magnitudes of the collector-current flow from said first and second transistor devices.

6. An electrical signalling system comprising: a series combination of two inductances; means for varying the inductive reactances of the two inductances differentially in dependence upon the value of a predetermined input variable; means for applying a cyclically-varying energizing signal between the two ends of said series combination; a first transistor having an emitter electrode connected to a first of the two ends of said series combination, a base electrode, and a collector electrode; a second transistor having an emitter electrode connected to the second of the two ends of said series combination, a base electrode, and a collector electrode; means for connecting the base electrode of said first transistor to the emitter electrode of said second transistor; means for connecting the base electrode of said second transistor to the emitter electrode of said first transistor; a first direct-current path for connecting the collector electrode of said first transistor to a point intermediate the two inductances in said series combination; a second direct-current path for connecting the collector electrode of said second transistor to said intermediate point; and output means coupled to said first and second paths for providing an output representation dependent upon the relative magnitudes of direct-current flow in said first and second paths respectively.

7. An electrical signaling system according to claim 6 wherein said output means is a ratiometer device having two ratio-windings, and wherein circuit means connects the collector electrodes of said first and second transistors to said intermediate point via the two ratio-windings respectively.

8. An electrical signalling system according to claim 6 including resistance connected between the collector electrodes of said first and second transistors, a movable tap on said resistance, circuit means connecting said tap to said intermediate point, and servo means responsive to direct-current signal-difference between said collector electrodes for moving said tap in a sense to reduce said difference to zero.

9. An electrical signalling system comprising: a series combination of two resistances; reactance connected across a first of said two resistances; a variable-frequency source of a cyclically-varying signal; means for applying said signal between the two ends of said series combination; a first transistor having an emitter electrode connected to a first of the two ends of said series combination, a base electrode, and a collector electrode; a second transistor having an emitter electrode connected to the second of the two ends of said series combination, a base electrode, and a collector electrode; means for connecting the base electrode of said first transistor to the emitter electrode of said second transistor; means for connecting the base electrode of said second transistor to the emitter electrode of said first transistor; a first direct-current path for connecting the collector electrode of said first transistor to a point intermediate the two resistances in said series combination; a second direct-current path for connecting the collector electrode of said second transistor to said intermediate point; and output means coupled to said first and second paths for providing an output representation dependent upon the relative magnitudes of direct-current flow in said first and second paths respectively.

10. An electrical signalling system according to claim 9 wherein said output means is a ratiometer device having two ratio-windings, and wherein circuit means connects the collector electrodes of said first and second transistors to said intermediate point via the two ratio-windings respectively.

11. An electrical signalling system according to claim 9 including further resistance connected between the collector electrodes of said first and second transistors, a movable tap on said further resistance, circuit means connecting said tap to said intermediate point, and servo means responsive to direct-current signal-difference between said collector electrodes for moving said tap in a sense to reduce said difference to zero.

12. An electrical signalling system for providing an output representation dependent upon the value of a predetermined input variable, comprising: first and second electrical circuit points; means for applying a cyclically-varying energizing signal between said first and second points; signal-deriving means coupled between the said first and second points to derive from the energizing signal two cyclically-varying signals having amplitudes that relative to one another are dependent upon the value of said variable, said signal-deriving means having a common output circuit point and supplying the two signals between the common output point and the first and second points respectively; first and second transistor devices for rectifying the two signals supplied by said signal-deriving means, the first transistor device having a base electrode connected to said second point and an emitter-collector current path coupled between said first point and said common output point, and the second transistor device having a base electrode connected to said first point and an emitter-collector current path coupled between said second point and said common output point; and output means coupled to the emitter-collector current paths of the first and second transistors to provide said output representation in accordance with the relative magnitudes of the rectified currents in those two paths.

13. An electrical signalling system according to claim 12 wherein said signal-deriving means comprises first electrical impedance means coupled between said first point and said common output point, second electrical impedance means coupled between said second point and said common output point, and means for varying the impedance values of the said first and second impedance means differentially.

14. An electrical signalling system according to claim 12 wherein said means for applying a cyclically-varying signal comprises a variable-frequency source coupled across said first and second points, said signal-deriving means comprising means to derive said two cyclically-varying signals with amplitudes that relative one to the other are dependent upon the frequency of the signal supplied across the said first and second points by said variable-frequency source.

References Cited
UNITED STATES PATENTS

| | | | |
|---|---|---|---|
| 2,900,506 | 8/1959 | Whetter | 307—232 |
| 3,038,762 | 6/1962 | Beatrice | 307—232 |
| 3,068,388 | 12/1962 | Burski | 323—75 |
| 3,083,324 | 3/1963 | Wolff | 307—232 |

DONALD D. FORRER, Primary Examiner

H. A. DIXON, Assistant Examiner

U.S. Cl. X.R.

307—308; 328—1